Feb. 19, 1935. F. WINDFUHR 1,991,437
METHOD OF MAKING BOXES
Original Filed Dec. 26, 1933   2 Sheets-Sheet 1
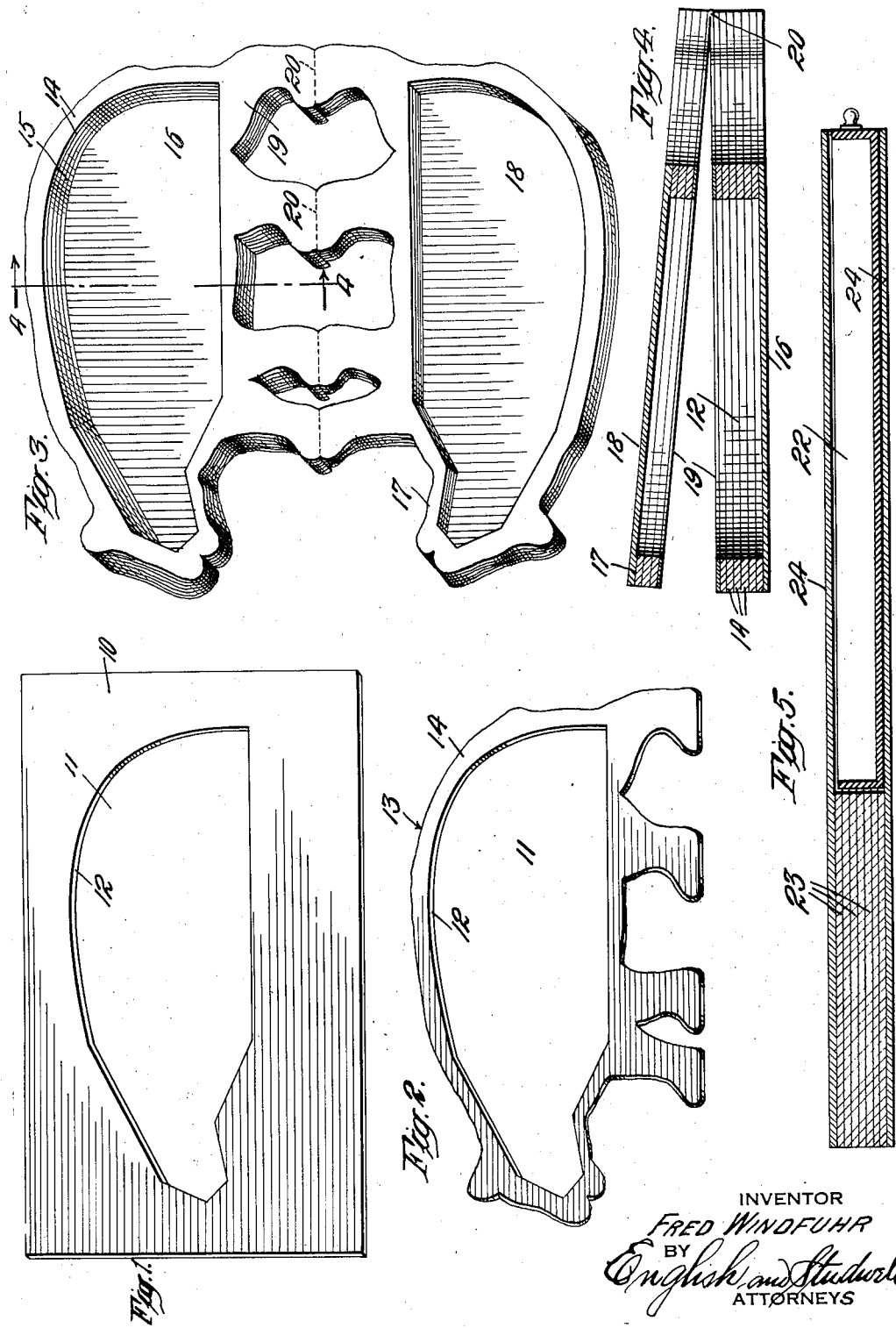
INVENTOR
FRED WINDFUHR
BY
English and Studwell
ATTORNEYS Feb. 19, 1935.  F. WINDFUHR  1,991,437
METHOD OF MAKING BOXES
Original Filed Dec. 26, 1933  2 Sheets-Sheet 2
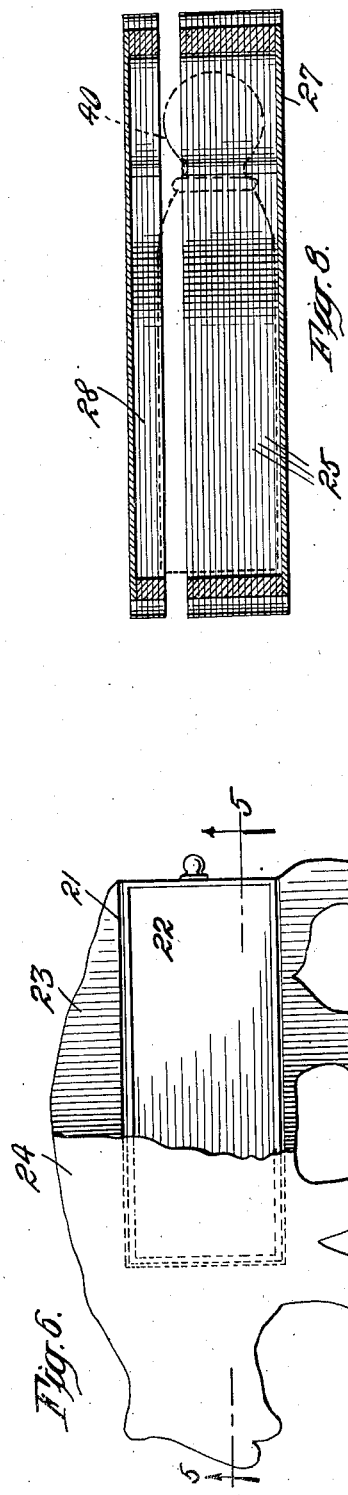
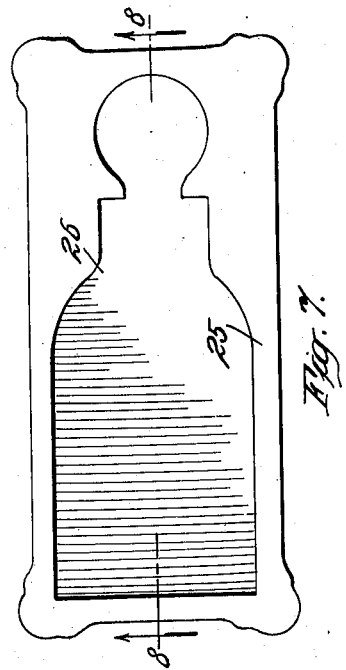
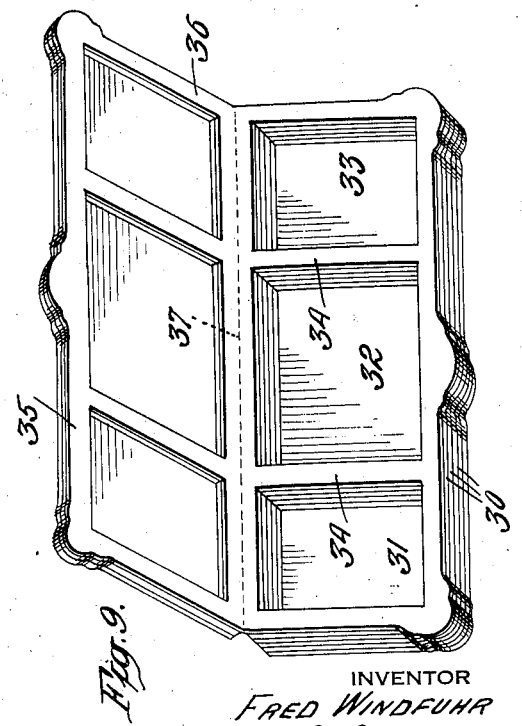
INVENTOR
FRED WINDFUHR
BY
English and Studwell
ATTORNEYS Patented Feb. 19, 1935

1,991,437

UNITED STATES PATENT OFFICE 1,991,437

METHOD OF MAKING BOXES

Fred Windfuhr, North Bergen, N. J., assignor to Joseph Dixon Crucible Company, Jersey City, N. J., a corporation of New Jersey Original application December 26, 1933, Serial No. 703,925. Divided and this application July 21, 1934, Serial No. 736,297

6 Claims. (Cl. 93—36)

This invention relates to an improvement in methods of making boxes, and more particularly to making boxes having an irregular outline, and has for its object to provide a box of improved construction, composed of sheet material such as cardboard, fibre, thin wood or the like, produced by the present novel method. A box made in accordance with the method of the invention possesses strength and sturdiness in excess of boxes constructed in the usual way from sheet cardboard. The invention also contemplates the making of boxes of regular and irregular outline by which they may be speedily, accurately and neatly made with a minimum of time and effort and without the use of expensive tools and dies. The present application is a division of my copending application, Serial No. 703,925, filed December 26, 1933.

More specifically, the invention contemplates a box composed of a number of apertured contiguous layers or laminæ adhesively united to "build up" a merchandise-holding compartment of requisite shape and depth, the apertured layers being closed on one face by an imperforate bottom sheet and either removably or permanently closed on the other face by a cover sheet. The method of making the box is such that the box may be made in numerous shapes, sizes and styles according to the articles to be contained in it.

In the accompanying drawings, wherein several embodiments of boxes produced by the method of the invention are shown, Fig. 1 is a perspective view of a piece of sheet material showing the first step in blanking out one of the members which forms a lamina or layer of the body of the box; Fig. 2 is a perspective view of one of the box body layers after it has been fully stamped out from the sheet shown in Fig. 1; Fig. 3 is a perspective view of a hinged box shown in open position; Fig. 4 is a sectional view on the line 4—4 of Fig. 3, looking in the direction of the arrows, the box being shown in a partly closed position; Fig. 5 is a sectional view on the line 5—5 of Fig. 6, looking in the direction of the arrows; Fig. 6 is a plan view, with parts broken away, of a type of box provided with a sliding tray; Fig. 7 is a plan view of a box body intended for the reception of a bottle or other irregularly shaped article; Fig. 8 is a sectional view on the line 8—8 of Fig. 7, looking in the direction of the arrows, a cover being shown partly in place on the box; and Fig. 9 is a perspective view of a modified structure wherein the box compartment is divided by partitions.

Referring to the structure shown in Figs. 1 to 4 inclusive: At 10 is shown a sheet of cardboard or other like material which is fed to suitable dies that operate to cut out an aperture 11 in the sheet. The edge 12 of the aperture defines the shape of the merchandise-holding compartment of the box. After the aperture 11 has been cut in the sheet 10, the latter is fed to other dies which have cutting edges conforming in shape to a line defined by the edge 13 of the skeleton member or layer 14 shown in Fig. 2, these dies acting to cut a member of the shape shown at 14 from the sheet 10. A number of these members 14 are adhesively united in superimposed relationship so as to form a hollow laminated block, producing an irregularly outlined open-sided box body of substantial thickness and strength. The number of layers 14 used depends upon the depth required in the box body. In some cases, when a box of very shallow depth is desired, only one of the members 14 is used. When a box body of considerable depth is required, the number of adhesively-united layer members 14 used is increased accordingly.

When a box body of the required thickness, such as shown at 15 in Fig. 3, has been built up by adhesively uniting a number of the layers 14, a bottom is supplied to the box body by adhesively applying an imperforate sheet 16 to one face of the laminated box body. The sheet 16 conforms in outline to the member 14 and is produced by the dies which cut along the line 13.

The next step in the method of making the box consists in forming a cover. In the structure shown in Fig. 3, which is a hinged box, the cover 17 is constructed similarly to the body of the box. That is to say, it is composed of a number of adhesively united layers 14 covered at one side by an imperforate sheet 18 conforming in shape to that forming the bottom 16 on the box body. The body of the box and its cover 17 are hinged together by a sheet 19 which conforms in outline to two opposed blank members 14 and is integrally connected on the line 20 which constitutes a fold line and forms a hinge for the body of the box and its cover. The edges of the box and its cover may be smoothed, colored or decorated in any suitable manner.

In Figs. 5 and 6 is shown a box provided with an aperture 21 open at one end to permit the entry of a sliding tray or drawer 22 within the aperture. The box shown is similar to that of Figs. 3 and 4 as far as its method of manufacture is concerned. Its several contiguous, adhesively united layers or laminæ 23 differ from the layers shown at 14 only in the shape of the aperture 21 which is open at one end. The two side faces of the block of adhesively united layers 23 are covered by closure sheets 24, conforming to those shown at 16 and 18 in Fig. 3. The box so formed is completely closed except for the open end of the recess 21 in which the tray is removably held.

In Figs. 7 and 8 a box body is shown formed of a number of layers 25 which are stamped out and adhesively united in the manner heretofore explained, to build up a box of required depth. The aperture 26 in this box is irregularly shaped to accommodate a bottle 40 or other irregularly shaped object. A bottom 27 is adhesively applied to the box body, and a cover 28, constructed similarly to the box body, is provided. The cover may be hinged to the body of the box in the manner described with respect to the structure shown in Fig. 3 or it may be removably secured to the box body in any other desired manner.

In the structure of Fig. 9 a box body is shown composed of a number of layers 30 adhesively united in the manner herein explained to form a box of required depth. The box body is provided with a number of spaced apertures 31, 32 and 33, having partitions 34 located between them to divide the box body into several compartments. The cover 35 for the box is constructed similarly to the body and is shown secured to the body by a hinge sheet 36 having the fold line 37 on which the cover is pivoted with respect to the box body.

The structures shown in the several views of the drawings are only a few of the many forms in which novel boxes of sturdy construction can be made from sheet material, according to the improved method. It is obvious that boxes of many other novel forms and shapes can be made according to this invention without departing from the spirit thereof.

What I claim is:

1. The method of making boxes consisting in stamping apertured layers from sheet material, arranging the layers face to face in superimposed relation with their apertures in registration to form a hollow laminated box body and adhesively uniting said layers over areas bounding the apertures, and adhesively applying a sheet of material of the same outline as the other layers to one face of the box body to form a bottom therefor.

2. The method of making boxes consisting in cutting a number of apertured blanks from sheet material, arranging the blanks face to face in superimposed relation with their apertures in registration to form a hollow laminated box body and adhesively uniting said blanks over areas bounding the apertures, adhesively attaching an imperforate sheet conforming in outline to the blanks, to one face of the box body to form a closed bottom therefor, and attaching a cover of the same outline to the box body.

3. The method of making boxes consisting in cutting an aperture in a sheet of material, cutting around said aperture at a distance therefrom to remove a skeleton-like blank from the sheet, adhesively uniting a number of said blanks with their edges and apertures in alignment to form a laminated hollow box body, and closing at least one side of the registered apertures extending through the box body.

4. The method of making boxes consisting in cutting an aperture in a sheet of material, cutting around said aperture at a distance therefrom to remove a skeleton-like blank from the sheet, adhesively uniting a number of said blanks with their apertures in alignment to form a laminated hollow box body, attaching a sheet conforming in outline to the blanks to one face of the united blanks to close one end of the aligned apertures therein, and attaching a cover to the box body so formed.

5. The method of making boxes consisting in arranging a plurality of apertured sheets of material face to face in superimposed relation to form a laminated box body adhesively uniting the sheets over areas bounding the apertures, and adhesively securing an imperforate sheet conforming in outline to the box body laminations over one face of the box body to close one end of the apertures in the laminations.

6. The method of making boxes consisting in cutting a number of apertured layers from sheet material, arranging the layers in two piles and face to face in superimposed relation with the apertures in registration to form hollow box members, adhesively applying an imperforate sheet to one face of each box member to form a bottom for the apertures and adhesively applying a single perforated sheet to the other faces of the two box members with the perforations in the sheet registering with the perforations in the layers and with the single sheet constituting a hinge member for the box members, and said layers and perforated sheet being adhesively secured together over areas bounding the apertures.

FRED WINDFUHR.